Jan. 7, 1941.  C. WIGELL  2,227,871
JOINT BETWEEN TWO OBJECTS
Filed March 22, 1939  2 Sheets-Sheet 1
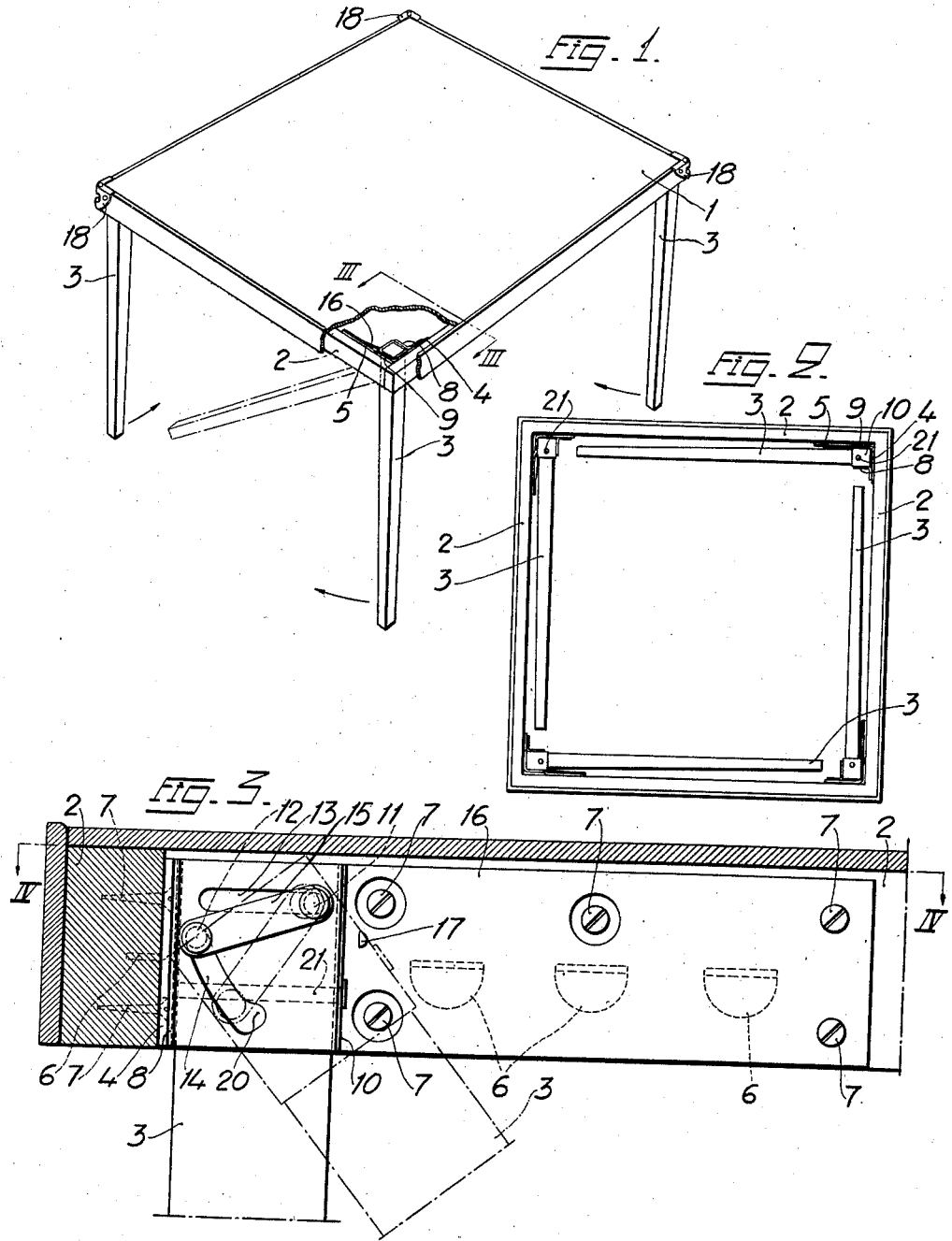
INVENTOR
CARL WIGELL
BY
Young, Emery & Thompson
ATTYS.

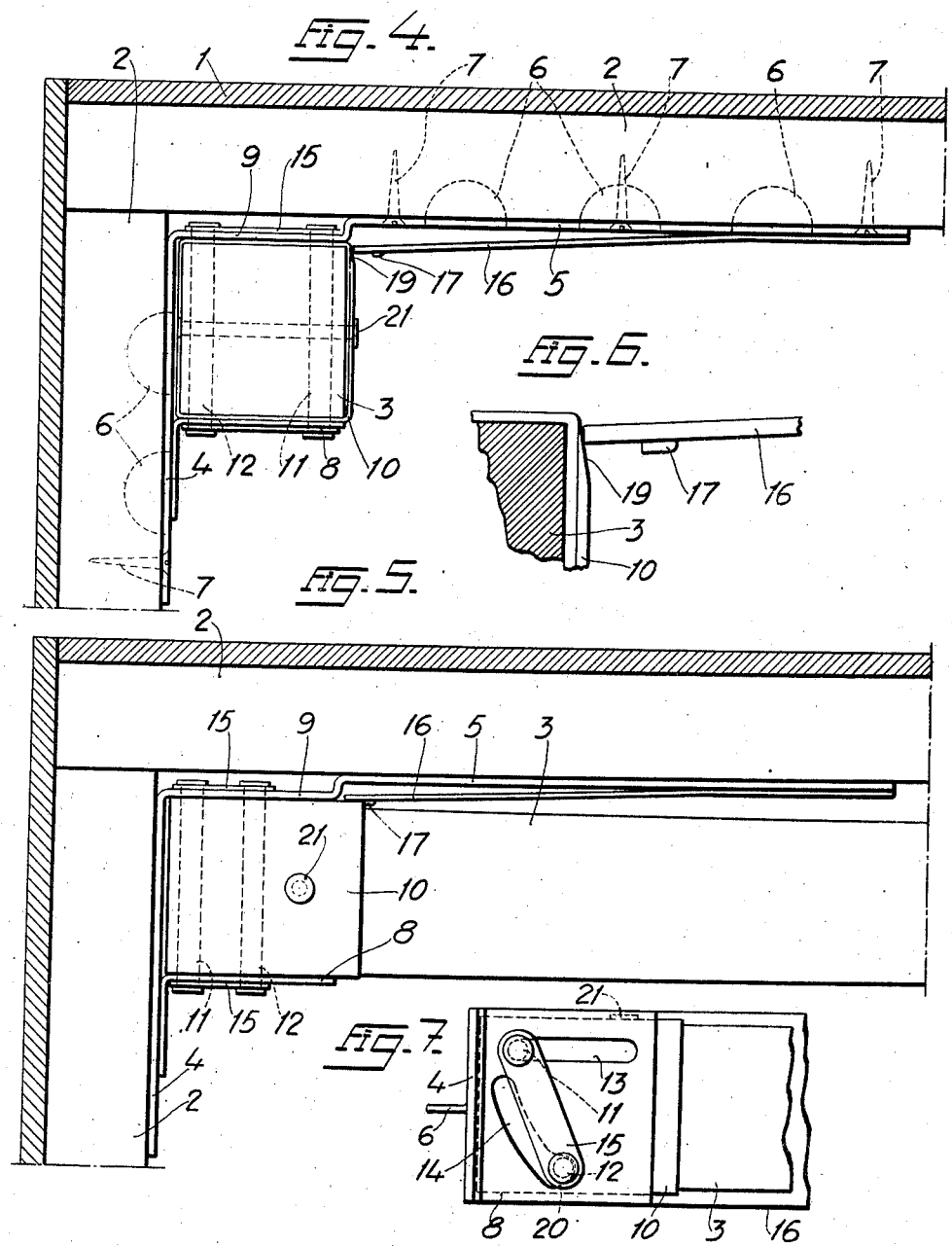

Patented Jan. 7, 1941

2,227,871

UNITED STATES PATENT OFFICE 2,227,871

JOINT BETWEEN TWO OBJECTS

Carl Wigell, Malmback, Sweden

Application March 22, 1939, Serial No. 263,541
In Sweden November 23, 1938

3 Claims. (Cl. 311—99)

The present invention relates to a joint for movably connecting one object with another. The invention is especially directed to the connection of foldable legs with furniture, particularly a table, so that the legs may be folded against the furniture, and folded out therefrom so that they will be about perpendicular to the horizontal plane of the furniture when supported by the legs.

The main object of the invention is to obtain a joint which is easy to manufacture and which guarantees a good guidance of the members. For this purpose a tongue or bolt and slot connection is used between the members, for example between the legs and the main portion of the furniture. This connection comprises two or several bolts on one member, for example on the legs, and slots on the other member or in fittings on the same for the guidance of the bolts. The slots are to be proivded in various positions and should extend at angles to one another. The bolts should alternatively act as pivots for the movable member, while at one end of the slot in question, and after they have moved to the other end of the slot upon folding of said member.

A further purpose is to provide releasable stops for the movable object or leg in its various positions.

These and other features are specified in the following description and claims, reference being made to the accompanying drawings, in which the invention is illustrated by way of an example and used in a table. It is to be noted that as to its details the invention is not limited to this example, other embodiments being also possible within the scope of the invention.

Fig. 1 is a perspective view of the table, provided with foldable legs according to the invention, part of the table being cut away.

Fig. 2 is a bottom view of the table with folded in legs,

Fig. 3 is a vertical sectional view of one corner portion of the table, with a leg indicated in two different positions, substantially along the line III—III in Fig. 1, Fig. 4 is a section substantially along the line IV—IV in Fig. 3, Fig. 5 is a sectional view corresponding to Fig. 3, but with the leg folded towards the table plate, Fig. 6 is a partly sectional view of the leg and the table with the device for locking the leg in the folded out position, and Fig. 7 is a partly sectional view of the leg with its fitting when in folded in position, the rest of the table being not shown.

In the drawings, the reference numeral 1 indicates the table plate, 2 the frame members, and 3 the legs foldable in the same direction. A fitting 18 may be provided at each outer frame corner so that it surrounds the ends of the adjacent frame members as shown for example in Fig. 1 in three corners. The fitting may be so constructed that an object, for example an ashtray, can be fixed thereto. In each frame corner an angular fitting is secured, the legs 4, 5 of the fitting resting on the inside of the adjacent frame members 2. In the example the fitting is secured by means of fins 6 and screws 7 pressed into the wood. A flange 8 secured, for example by rivets, to the leg 4 projects perpendicularly from the same. Thus, the flange is parallel with the leg 5. That portion of the leg which is situated immediate to the frame corner has a portion 9 bent in direction away from the frame so that a space of about the same length as the flange 8 is formed between the said leg portion and the frame member 2.

To the bearing end of each table leg there is secured a fitting or sleeve 10 retained by means of a bolt 21. The leg is journalled at the respective inner frame corner by a slot and bolt connection, including two bolts and two pairs of slots. The bolts 11, 12 extend through the leg and engage with their one ends or heads two slots 13, 14 respectively in the projecting flange 8 and with their other ends or heads opposite, correspondingly shaped slots, not shown, in the leg portion 9 parallel with the flange 8. The sleeve 10 is closely fitted between the portions 8 and 9. It is evident that the arrangement may also be the reversed one, i. e. bolts or tongues may be provided in the fitting portions 8 and 9 and slots or grooves in the sleeve 10. Each of the through bolts may also consist of two projections right opposite each other. The bolt heads on each side are connected by means of a link 15, the ends of which surrounding the bolts have such a diameter that they form washers for the bolt heads so that these are retained outside the slots. Of course, washers for the bolt heads may also be provided in addition to the connecting member.

The slots 13, 14 in the flange 8 and the corresponding opposite slots in the leg portion 9 are provided on both sides of a diagonal plane. The slot 13 is straight and of the same width throughout. The slot 14 is curved, as shown, and has an extension at its lower end, see Figs. 3 and 7.

The case may, of course, also be the reversed one, i. e. the slot 13 is curved and provided with an extension, and the slot 14 is straight. Each slot 13 extends approximately horizontally or parallel with the table plate 1, whereas each slot 14 extends from a point somewhat below that end of the slot 13 which is located at the frame corner, and forms an acute angle with said slot 13, said slot 14 being directed downwards and inwards towards the middle of the table and ending at some distance from the lower edge of the respective fitting portions 8 and 9.

A resilient tongue 16 has one end secured near the end of the leg 5 and extends to the sleeve 10 when the leg is folded out and somewhat past the inner edge of the sleeve when the leg is folded in against the table. In the rail 16 there are through holes for the screw heads of some of the screws 7. When a leg is brought down to the supporting position the free edge of the resilient tongue 16 snaps out behind the sleeve 10 and locks the leg in this position, see particularly Figs. 4 and 6. That portion 19 of the sleeve 10 against which the edge of the spring rests inclines in such a way towards the spring that the spring is tightened harder the farther it moves on the inclined portion. At the folded in position of the legs they are retained by friction partly between the spring 16 and the sleeve 10 and partly between the sleeve 10 and the portions 8 and 9. In order to further increase the retaining action of the resilient rails 16 in this position of the legs a projection 17 is provided on each of the members 16 at such a distance from the edge of said member that when the leg is folded in the projection extends inside the lower edge of the sleeve, see Fig. 5. When the leg is being folded out the projection moves up on the sleeve and the leg may be folded down, whereby owing to its pressing the spring 16 occasions a suitable slow motion of the leg. Several projections 17 may be provided. They may also be omitted. When the leg is in the supporting, locked position, see Figs. 4 and 6, the locking tongue 16 is released by pressing it towards the leg 5. The leg may now be folded in, the spring owing to its pressing against the sleeve 10 offering a suitable resistance. The spring member 16 may, of course, be replaced by resilient members of another kind.

The device operates in the following manner. When the respective legs are moved from the supporting position to the folded in position, see Figs. 1 and 2, the bolt 11 first acts as a pivot, see particularly Fig. 3, whereas the lower situated bolt 12 slides downwards in its slot 14, this movement being enabled by the curved form of the slot. When the leg has moved somewhat farther than the position indicated by dot and dashed lines in Fig. 3, i. e. when it has been swung about 45°, the bolt 12 has reached the lower end of the slot 14. As the movement continues, this bolt, which moves into the extension 20, now acts as a pivot, whereas the bolt 11 slides outwards in the slot 13 until it has reached the outer end of the same, see particularly Fig. 7. The leg is then in a horizontal folded in position or in a position parallel with the table plate, inside the respective frame members, see Fig. 2, and is retained by the bolt and slot connection and by the abovementioned friction between the members 8 and 9 and the sleeve 10, by the pressure of the spring 16 and by the projection 17 which is in the locking position against the sleeve 10. After pressure upon the spring 16 the leg may be swung down again, and when the legs are in the folded out position they are locked, as mentioned above, by the portions 19 of the sleeves 10 taking support against the free end of the spring members 16.

Having now described my invention, what I claim as new and desire to secure by Letters Patent is:

1. In a device of the character described having a top, a frame and foldable legs, a leg-supporting bracket positioned in a corner of the frame and having arms lying against two adjacent sides of the frame, a flange projecting from one arm of the bracket parallel to the other arm of the bracket and cooperating with said other arm to provide bearing surfaces for a foldable leg, a foldable leg having one end positioned between said bearing surfaces, each of said bearing surfaces having a pair of slots formed therein, the slots of one surface registering with those of the other surface, one of said slots being rectilinear and extending parallel to the table top and the other slot being arcuate and having its center of curvature located at one extremity of the rectilinear slot, a pair of spaced pins carried by each side of the leg and positioned in said slots, and releasable means for retaining the leg in opened position.

2. In a device of the character described having a top, a frame and foldable legs, a leg-supporting bracket positioned in a corner of the frame and having arms lying against two adjacent sides of the frame, a flange projecting from one arm of the bracket parallel to the other arm of the bracket and cooperating with said other arm to provide bearing surfaces for a foldable leg, a foldable leg having one end positioned between said bearing surfaces, each of said bearing surfaces having a pair of slots formed therein, the slots of one surface registering with those of the other surface, one of said slots being rectilinear and extending parallel to the table top and the other slot being arcuate and having its center of curvature located at one extremity of the rectilinear slot, a pair of spaced pins carried by each side of the leg and positioned in said slots, the arcuate slots each having a small arcuate extension the center of curvature of which is located at the other extremity of the rectilinear slot, and releasable means for retaining the leg in an adjusted position.

3. In a device of the character described having a top, a frame and foldable legs, a leg-supporting bracket positioned in a corner of the frame and having arms lying against two adjacent sides of the frame, a flange projecting from one arm of the bracket parallel to the other arm of the bracket and cooperating with said other arm to provide bearing surfaces for a foldable leg, a foldable leg having one end positioned between said bearing surfaces, each of said bearing surfaces having a pair of slots formed therein, the slots of one surface registering with those of the other surface, one of said slots being rectilinear and extending parallel to the table top and the other slot being arcuate and having its center of curvature located at one extremity of the rectilinear slot, a pair of spaced pins carried by each side of the leg and positioned in said slots, the arcuate slots each having a small arcuate extension the center of curvature of which is located at the other extremity of the rectilinear slot, and a resilient tongue adapted to engage the side of the leg in opened position, said side of the leg being inclined to cooperate with the tongue to produce a wedging action.

CARL WIGELL.